UNITED STATES PATENT OFFICE.

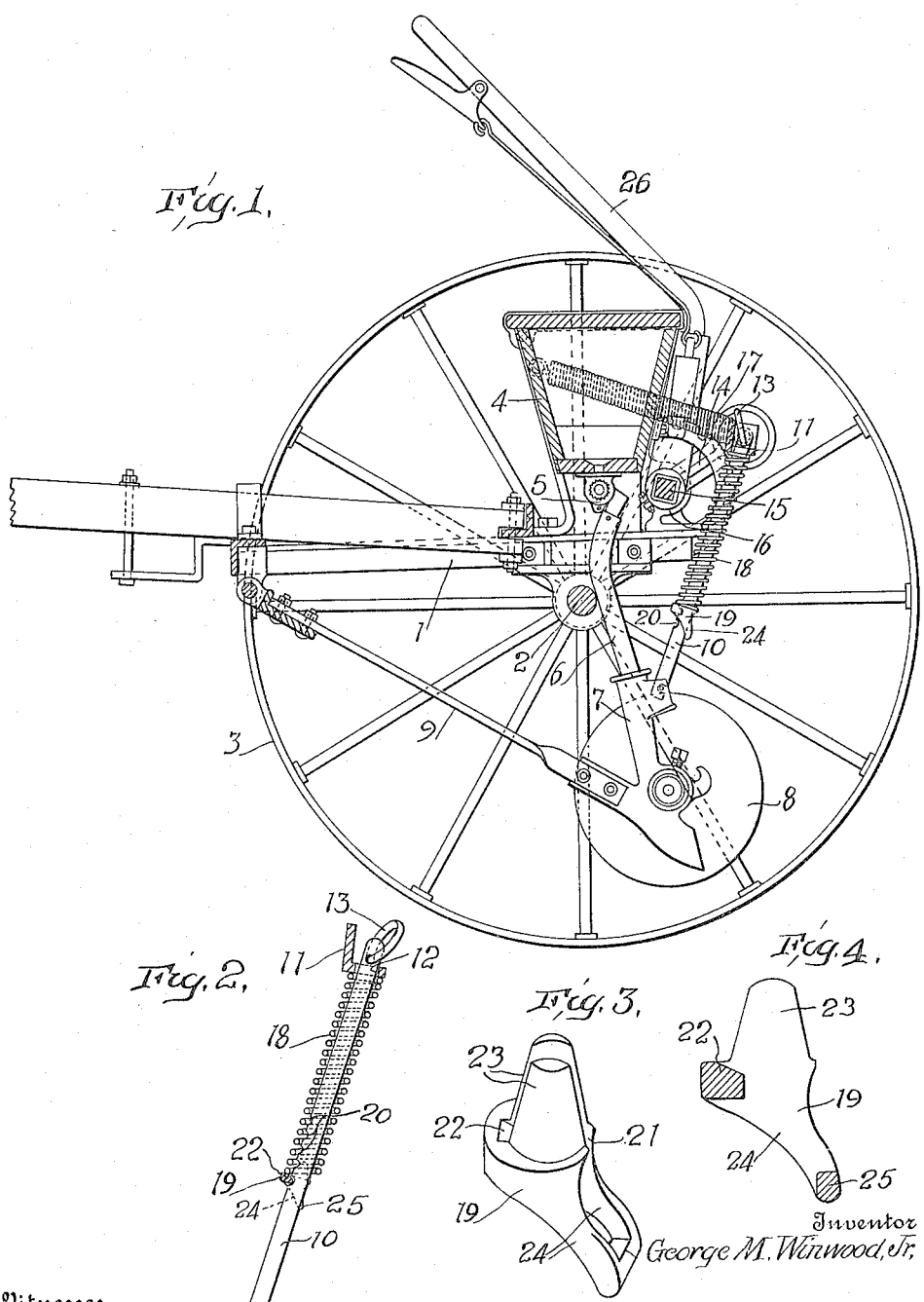

GEORGE M. WINWOOD, JR., OF SPRINGFIELD, OHIO.

SEED-DRILL.

1,133,351.

Specification of Letters Patent.   Patented Mar. 30, 1915.

Application filed October 4, 1912.   Serial No. 723,824.

*To all whom it may concern:*

Be it known that I, GEORGE M. WINWOOD, Jr., a citizen of the United States, residing at Springfield, in the county of Clark and State of Ohio, have invented certain new and useful Improvements in Seed-Drills, of which the following is a specification, reference being had therein to the accompanying drawing.

This invention relates to seed drills.

The object of the invention is to improve the construction of the drill both from a manufacturing and an operating standpoint. To this end I have provided improved means for connecting the thrust rods with the supporting bar. Further, I have provided an adjustable stop for adjusting the tension of the springs on the thrust rods. I have also provided means to facilitate the raising and lowering of the supporting bar for the thrust rods and to retain this bar in one or the other of its positions.

In the accompanying drawings, Figure 1 is a sectional view taken transversely through the hopper and axle of a seed drill embodying my invention; Fig. 2 is a sectional view of the supporting bar for the thrust rod showing the thrust rod in elevation; Fig. 3 is a perspective view of the adjustable stop for the thrust rod; and Fig. 4 is a section taken centrally of said stop.

In these drawings I have illustrated one embodiment of my invention and have shown the same in connection with a drill comprising a frame 1 carried by an axle 2 on which are mounted ground wheels 3, one of said wheels only being shown. Mounted upon the frame 1 is the usual seed hopper 4, having a series of seed delivery devices 5 communicating by means of tubes 6 with seed boots 7 which discharge the seed into a furrow opened by a furrow opening disk 8. The boot 7 is connected with the forward portion of the frame by means of a drag bar 9 and has connected to its upper portion a thrust rod 10 which extends upwardly and rearwardly therefrom and is slidably connected with a supporting bar 11. This supporting bar is here shown as formed of angle iron having one flange arranged substantially horizontal and provided with an opening 12 for each thrust rod. The thrust rod extends through this opening and is retained therein by a stop, such as a ring 13, extending through the rod 10 above the flange 12.

The supporting bar 11 is supported at its opposite ends by means of arms 14 which are rigidly secured to the adjacent ends of a shaft 15 journaled in bearings 16 on the main frame 1. A spring 17 is secured to the supporting bar at the end thereof and to a fixed part of the machine, preferably the hopper. One or more of these springs may be provided but preferably there is one at each end of the supporting bar. The point of connection of the spring with the hopper is such that when the supporting bar is moved from its upper to its lower position, or vice versa, the spring will be carried across the center about which the supporting bar moves, thus causing it to exert its pull upon the bar in the opposite direction. Thus, if the lifting bar is elevated to a point just across the line extending through the center of the axis of its movement and the point of connection of the spring to the hopper, the spring will then exert an upward pull on the bar and materially assist in elevating the same. The same is true when the supporting bar is moved downward and then the spring tends to force the supporting bar and thrust rods downward and hold the furrow opening disk 8 in engagement with the ground.

Suitable springs are preferably interposed between the supporting bar and the respective thrust rods. As here shown a spring 18 is coiled about each rod and confined between the lower flange of the supporting bar and a stop 19 on the rod. Preferably, this stop is an adjustable stop to enable the tension of the spring to be regulated. While this adjustment may be secured in various ways that shown in the drawings affords a very convenient and easy method of securing the desired adjustment. As here shown the rod 10 is provided in one edge with a series of notches 20 and the clip or stop 19 is in the form of a collar extending about the rod and having its rear edge so slotted, as indicated at 21, to permit the passage of the rod, and provided at its forward edge with a tongue 22 adapted to enter any one of the notches 20. Secured to the collar on opposite sides of the slot 20 and extending upwardly are tapered fingers 23 adapted to extend between the coils of the spring and the respective sides of the rod. These fingers are of less thickness at their base than the collar and the lower coil of the spring which surrounds the finger will rest upon the collar, the finger serving to center the same thereon. The collar is also provided with downwardly extending arms 24 connected at their lower ends by a cross bar 25 which bears normally against that edge of the rod opposite the notches 20. The construction of the clip is such that when in its normal position, as shown in Fig. 2, it will be secured firmly in position with the tongue in one of the notches and will afford a positive stop for the spring. It can be very easily manipulated, however, to remove the tongue from the notch and permit the clip to be adjusted to secure the desired tension on the spring.

The movement of the supporting bar 11 about the axis of the shaft 15 may be accomplished in any suitable manner. In the present instance I have provided the same with a hand lever 26, of a well known type, which is secured to one end of the shaft and affords a ready means for actuating the same.

While I have shown and described one embodiment of my invention it will be understood that this has been chosen for the purposes of illustration only and that I do not desire to be limited to the details of construction shown and described, for obvious modifications will occur to a person skilled in the art.

Having thus fully described my invention, what I claim as new and desire to secure by Letters Patent, is:—

1. In a seed drill, the combination, with a frame, a seed hopper, and a series of boots supported beneath said hopper, of a supporting bar movable about an arc having a fixed center on said frame, said bar having a substantially horizontal portion provided with vertical openings, thrust rods connected with the respective seed boots and extending loosely through the respective openings in said bar, a stop carried by each rod, a spring carried by each rod and confined between said bar and said stop, means for shifting said bar about said fixed axis, and a spring connected with said bar and with a fixed part of said frame and tending to move said bar toward its extreme position on either side of the fulcrum thereof.

2. In a seed drill, the combination, with a frame, a seed hopper, a seed boot supported beneath said hopper, and a supporting bar, of a thrust rod connected with said seed boot and with said supporting bar, said thrust rod having a series of notches in one edge thereof, a stop carried by said thrust rod and comprising two substantially parallel members arranged on opposite sides of said rod, a collar formed integral with said members, connecting the same at points between their ends and having an opening in one side thereof registering with the space between said parallel members, a cross bar connecting the lower ends of said members, the lower ends of said members and said cross bar being offset from the vertical line of the upper portions of said members to enable said cross bar to engage said rod on that side thereof adjacent to the opening in said collar, a spring coiled about said rod between said supporting bar and said collar and inclosing the upwardly extending portions of said parallel members.

3. In a seed drill, the combination, with a frame, a seed hopper, and a seed boot supported beneath said hopper, of a supporting bar, arms connected with said supporting bar and pivotally mounted on said frame, thrust rods connected with said boot and with said supporting bar, and a spring connected with said supporting bar and with a fixed part of said drill, the point of connection to said drill being so arranged that the movement of said supporting bar about its axis will cause said spring to pass over said axis and thus reverse the direction of its pull on said bar.

4. In a seed drill, the combination, with a frame, a seed hopper, and a seed boot supported beneath said hopper, of a supporting bar, arms connected with said supporting bar and pivotally mounted on said frame, thrust rods connected with said boot and with said supporting bar, and a spring connected to each end of said supporting bar and to the adjacent end of said hopper, the points of connection of said springs to said hopper being so arranged with relation to said supporting bar that when the latter is moved about its axis said springs will be carried across said axis and thus reverse the direction of their pull on said bar.

In testimony whereof, I affix my signature in presence of two witnesses.

GEORGE M. WINWOOD, Jr.

Witnesses:
FLORENCE GARRITY,
E. F. McKEE.